United States Patent [19]

Salter et al.

[11] Patent Number: 4,750,434
[45] Date of Patent: Jun. 14, 1988

[54] MILL/DRYER GAS TEMPERATURE CONTROL

[75] Inventors: James A. Salter, Katy; Thomas R. Schmidt; Frederik M. H. J. Duysings, both of Houston, all of Tex.; Rudi Everts, The Hague, Netherlands; David Brown, Amsterdam, Netherlands; Johannes W. van der Meer, Amsterdam, Netherlands

[73] Assignee: Shell Oil Company, Houston, Tex.

[21] Appl. No.: 97,004

[22] Filed: Sep. 16, 1987

[51] Int. Cl.[4] .................................................. F23N 5/18
[52] U.S. Cl. ........................................ 110/186; 34/54; 34/56; 48/77; 48/210; 110/101 C; 110/101 CC; 110/101 CF; 110/224; 110/188

[58] Field of Search ............... 110/185, 186, 188, 229, 110/101 R, 101 C, 101 CC, 101 CF, 224; 48/77, 101, 210; 34/56, 46, 54

[56] References Cited

U.S. PATENT DOCUMENTS

| 4,373,451 | 2/1983 | Gardner et al. | 110/101 CC |
| 4,430,963 | 2/1984 | Finet | 122/449 |
| 4,532,873 | 8/1985 | Rivers et al. | 110/224 X |
| 4,572,086 | 2/1986 | Ladt et al. | 110/224 X |
| 4,599,809 | 7/1986 | Parkes | 34/56 X |

Primary Examiner—Edward G. Favors

[57] ABSTRACT

A method and apparatus for controlling moisture content of a solid, such as pulverized coal, conveyed to a reactor, such as a gasifier, by controlling the temperature of a gas injected into a pulverizer or dryer based on the moisture content control of the coal transported to the gasifier.

30 Claims, 1 Drawing Sheet

MILL/DRYER GAS TEMPERATURE CONTROL

BACKGROUND OF THE INVENTION

Conventional control systems for supplying pulverized coal to furnaces, such as rotary kilns, control the temperature of the inlet gas to a pulverizer or dryer based on a fixed outlet temperature of the coal and air mixture leaving the pulverizer.

For example, U.S. Pat. No. 3,050,018 discloses a control system applicable for rotary kilns and metallurgical furnaces whereby, the temperature of the coal and air mixture leaving the pulverizer is maintained at a selected value and the temperature of the air entering the pulverizer is changed to maintain a uniform exit temperature.

However, controlling the temperature of the inlet gas to the pulverizer or dryer based on the measured moisture removed from the coal or the actual moisture in the coal transported to burner is a more accurate controlling mechanism for various types of coal, which characteristically have different amounts of moisture. Fluctuations of coal moisture content to burners of a coal gasification reactor, hereinafter referred to as a gasifier, are detrimental to gasifier performance. For example, fluctuations cause inefficient gasification of fuel within the gasifier. The efficient gasification of a fuel depends on the ratios of carbon, hydrogen, and oxygen in the reactor. Coal consists primarily of carbon, hydrogen, oxygen, water and non-combustible materials. For a given coal source the carbon, hydrogen, oxygen and non-combustible materials are relatively constant but the water content can vary widely. Since water is comprised of hydrogen and oxygen, the water content of the reactor feed must be measured and controlled for efficient gasification.

The present invention is directed to overcoming this problem in the prior art.

Applicants are not aware of any prior art which, in their judgment as persons skilled in this particular art, would anticipate or render obvious the present invention. However, for the purpose of fully developing the background of this invention, and establishing the state of requisite art, the following art is set forth: U.S. Pat. No. 4,430,963.

SUMMARY OF THE INVENTION

The primary purpose of the present invention relates to controlling moisture content of solids to a reactor. In particular, this invention relates to controlling moisture content of a particulate solid coal to a gasifier.

Preferably, such an apparatus includes: means for conveying the solids from a first containing means to the reactor, moisture measuring means located in proximity of the solids conveyed to the reactor, means for determining the total amount of moisture in the solids conveyed to said reactor, means for removing at least some moisture from the solids, and means for adjusting a temperature of the means for removing at least some moisture from the solids.

Preferably, a method for controlling moisture of solids to a reactor includes: conveying the solids to the reactor, measuring moisture of the solids conveyed to the reactor, determining the total amount of moisture in the solids conveyed to the reactor, removing at least some moisture from the solids, and adjusting a temperature of the means for removing at least some moisture from the solids.

The various features of novelty which characterize the invention are pointed out with particularity in the claims forming a part of this disclosure. For a better understanding of this invention, its operating advantages and specific object obtained by its uses, reference may be made to the accompanying drawings and descriptive matter in which there are illustrated preferred embodiments of the invention.

DESCRIPTION OF A PREFERRED EMBODIMENT

Figure 1:
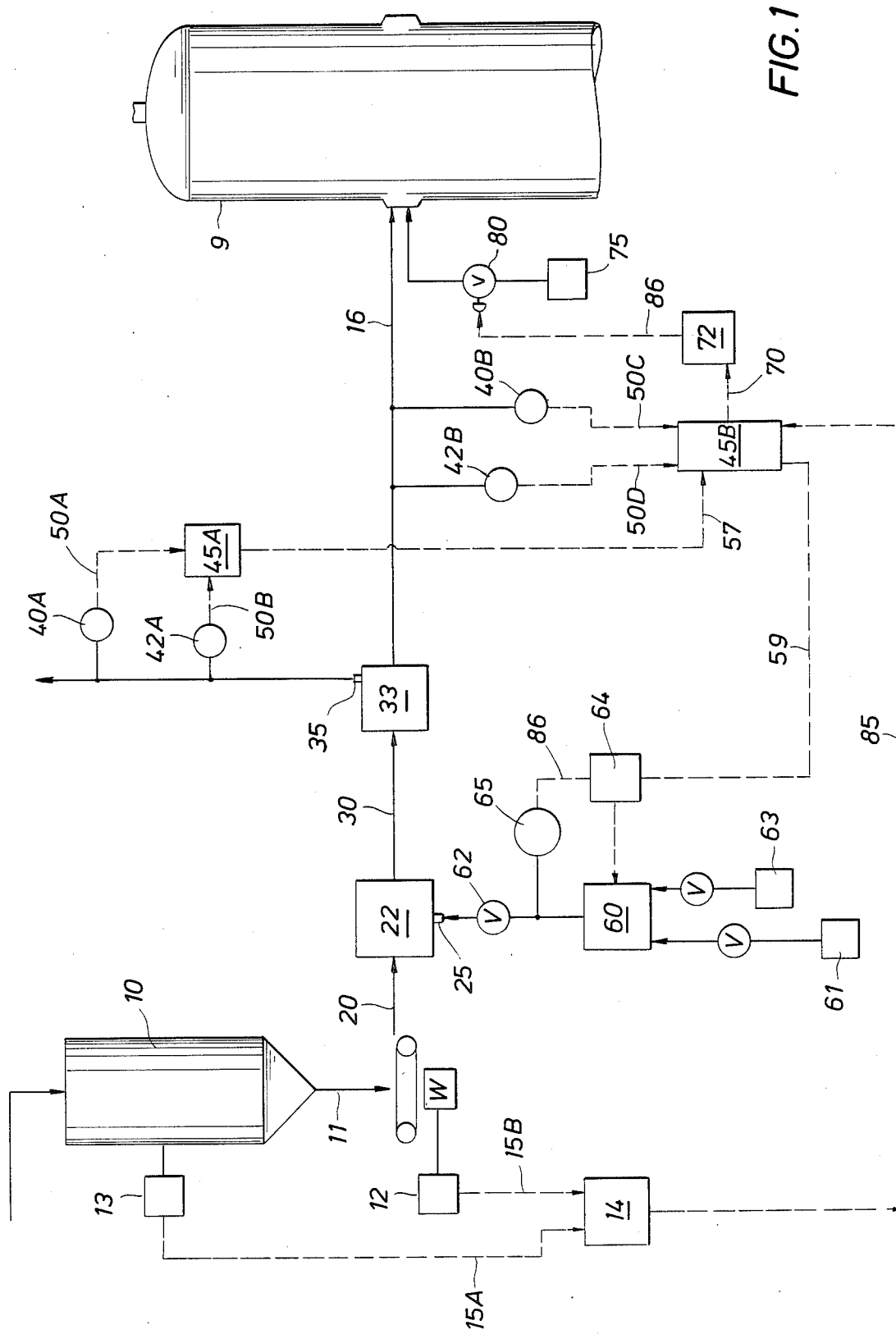
FIG. 1 illustrates a preferred embodiment of the invention.

Generation of synthesis gas occurs by partially combusting hydrocarbon fuel, such as coal, at relatively high temperatures in the range of 800°–2000° C. and at a pressure range of from about 1–200 bar in the presence of oxygen or oxygen-containing gases in a gasifier. Oxygen-containing gases include air, oxygen enriched air, and oxygen optionally diluted with steam, carbon dioxide and/or nitrogen.

In the present invention, the fuel and gas mixture is discharged from a feed vessel apparatus, preferably having multiple outlets, each outlet being in communication with at least one burner associated with the gasifier. Typically, a gasifier will have four burners in diametrically opposing positions. Generally, the burners have their discharge ends positioned to introduce the resulting flame and the agent of combustion into the gasifier.

Of particular importance in the manufacture of synthesis gas is the uniform manner in which the particulate fuel is introduced to the burners within the gasifier, and in particular, the uniform moisture content of the fuel. Variations in the moisture content of the fuel may result to zones of underheating generated next to zones of overheating in the gasifier. As a result, in the zones of underheating the fuel is not completely gasified and in zones of overheating the fuel is completely converted into less valuable products, viz. carbon dioxide and water vapor. The zones of overheating and underheating result when the oxygen/hydrogen/carbon ratio is incorrect, i.e. too little oxygen produces too little heat and incomplete gasification occurs. Likewise, too much oxygen produces too much heat and the fuel is converted to less valuable products. Coal is, from a simplified view, comprised of carbon, hydrogen, oxygen, non-combustible materials and water. For a given coal the carbon, hydrogen, oxygen and non-combustible materials are relatively constant, but the water content can vary widely. The coal must be measured and controlled to maintain the best oxygen/hydrogen/carbon ratio.

Additionally, local high temperatures in the gasifier could damage the burners or the refractory lining which is normally arranged at the inner surface of the gasifier wall.

Furthermore, the transport quality of the coal dust appears to be optimal at intermediate moisture contents so that stabilizing the moisture content of this value will favor good transportability characteristics. Additionally, drying the coal below the optimum value will decrease the overall efficiency of the plant since normally water (usually in the form of steam) is added to the coal/oxygen mixture.

Conventional control systems for supplying pulverized coal to furnaces, such as rotary kilns, control the moisture content to the furnace by controlling the temperature of the inlet gas to a pulverizer or dryer based on a fixed outlet temperature of the coal and air mixture leaving the pulverizer.

The present invention controls the temperature of the inlet gas to the pulverizer or dryer based on the measured moisture removed from the coal or the actual moisture in the coal transported to burner. Both are more accurate controlling mechanisms for varying types of coal, which characteristically have different amounts of moisture.

An advantage of the present invention is the capability to control the moisture content of coal leaving a pulverizer and/or dryer and transported to a gasifier based on the actual moisture content of the coal conveyed to the gasifier rather than a fixed outlet temperature of the pulverizer and/or dryer.

A further advantage of the present invention is that different coals, characteristically having different moisture contents, can be gasified since the present invention actually determines the moisture content of the coal transported to the gasifier and adjusts the means for removing moisture accordingly, based on the desired moisture content of the coal conveyed to the gasifier.

An additional advantage of the present invention is that by controlling the moisture content of the coal going to the reactor, the gasification reaction can be controlled such that the reactor can be operated at optimum or near optimum conditions.

Although the invention is described hereinafter primarily with reference to pulverized coal and a gasifier, the method and apparatus according to the invention are also suitable for catalysts and other finely divided reactive solids transported to a reactor wherein controlling moisture of the solids is a concern. Likewise, the present invention is also suitable for solid fuels which could be partially combusted, such as lignite, anthracite, bituminous, brown coal, soot, petroleum coke, and the like. Preferably, the size of solid carbonaceous fuel is such that 90% by weight of the fuel has a particle size smaller than 100 mesh (A.S.T.M.).

Having thus generally described the apparatus and method of the present invention, as well as its numerous advantages over the art, the following is a more detailed description thereof, given in accordance with specific reference to the drawing. However, the drawing is of the process flow type in which auxiliary equipment, such as pumps, compressors, cleaning devices, etc. are not shown. All values are merely exemplary or calculated.

Referring to FIG. 1 of the drawing, an apparatus for controlling the moisture content coal to a gasifier 9 generally comprises means for discharging coal, such as an outlet orifice 11, from a first containing means, shown for illustrative purposes as a bunker 10, to a means for weighing coal, such as a weighing belt 12.

The apparatus of the present invention includes means for determining a moisture content of the coal, such as a moisture analyzer 13, positioned so as to measure the moisture content of the coal prior to weighing the coal. Alternatively, the moisture content of the raw coal can also be determined by off-line analysis such as using A.S.T.M. procedure D3173-85.

Means for determining the total amount of moisture in the coal, such as a preliminary processor 14, includes means for combining the weight of the coal with the determined moisture content of the coal, say a computing device 14 using the following algorithm:

$$\text{Total moisture/hr} = \frac{\% \text{ moisture in coal} \times \text{weight of coal/hr}}{100}$$

or in any other manner well known to the art.

For example, FIG. 1 illustrates means for transmitting signals from the moisture analyzer 13 and weighing belt 12 such as transmission lines 15A, 15B, respectively, shown for ease of interpretation of FIG. 1 as dashed lines, coupled to the preliminary processor 14.

Preferably, the present invention employs both preliminary and primary processors of a system for controlling the moisture content of the coal to the gasifier as described hereinafter in further detail.

Coal is transported to a means for pulverizing the coal, such as a pulverizer 22, via a conduit 20. The pulverizer 22 is preferably provided with means for injecting gas at a preselected temperature and rate into the pulverizer to remove at least some moisture from the coal. For example, FIG. 1 shows an inlet opening 25 to the pulverizer 22 in fluid communication with a heating means, such as a heater 60, which receives air 61 and a fuel such as natural gas 63, the mixture of which is heated to a preselected temperature in heater 60 and injected at a preselected rate, preferably controlled by valve 62, into the pulverizer 22 to remove at least some moisture from the coal.

The coal is then transported via conduit 30 to a second containing means, which preferably includes means for removing particulates from the gas such as a bag filter 33. The bag filter 33 is provided with means for venting gas, shown in FIG. 1 as an outlet orifice 35.

A rate of gas vented from the bag filter 33 may be measured using a venturi-type flow meter (refer to ISO/TC 30231E. draft ISO recommendations No. 1-157) 40A or in any other manner well known to the art.

Moisture measuring means, such as a probe moisture analyzer 42A, would preferably be employed to measure the moisture of the gas vented from the bag filter 33.

Means for determining a total amount of moisture removed from the coal contained in the bag filter 33, such as a preliminary processor 45A, includes means for combining the measured rate of gas vented and the determined amount of moisture in the vented gas, such as a computing device 45A using the following algorithm:

$$\text{Total moisture} = \frac{\% \text{ moisture in gas} \times \text{weight of gas/hr}}{100}$$

or in any other manner well known to the art.

For example, FIG. 1 illustrates means for transmitting signals from the gas flow meter 40A and the moisture analyzer 42A such as transmission lines 50A, 50B, respectively, coupled to the preliminary processor 45A.

Means for determining a total amount of moisture in the coal conveyed to the gasifier includes means for combining the determined amount of moisture in the coal discharged from the bunker 10 with the total amount of moisture removed from the bag filter 33. A primary controller 45B, preferably includes means for receiving and transmitting signals, such as a computing device 45B using the following algorithm: Total moisture in milled coal/hr=Moisture in raw coal/hr—Moisture in vent gas/hr, or in any other manner well known in the art.

Signals relative to the determined total amount of moisture in the coal discharged from the bunker 10 and the total amount of moisture removed from the coal in the bag filter 33 are transmitted via lines 85 and 57, respectively, from the preliminary controllers 14 and 45A, respectively, in communication with the primary controller 45B.

Then, a signal relative to the total amount of moisture content in the coal transported to the gasifier via conduit 16 is transmitted via line 59 coupled to a means for controlling temperature, such as a preliminary processor 64 in communication with a heater 60 which adjusts the temperature of the gas injected into the pulverizer. The preliminary processor 64 compares the temperature of the gas injected into the pulverizer 22, as preferably measured by a thermocouple 65 which transmits a signal via line 86 coupled to the preliminary processor 64, with the temperature corresponding to the total amount of moisture content in the coal transmitted to the gasifier 9 as received by processor 64 via line 59. If the moisture content of the coal is greater than a preselected moisture content, then heat generated by the heater 60 is preferably increased until the temperature of the gas injected into the pulverizer 22 is substantially equal to that required to produce the corresponding preselected moisture content. The temperature of the gas is increased by increasing both the natural gas (or other heat-producing fuel) flow 63 and the airflow 61 to the heater 60.

Additionally, a signal relative to the total amount of moisture in the coal conveyed to the gasifier 9 is transmitted via line 70 from the primary processor 45B to means for controlling a ratio of oxygen 75 to coal injected into the gasifier 9, such as preliminary controller 72. The controller 72 transmits a signal via line 86 to means for adjusting the rate of oxygen 75 injected into the gasifier 9, such as valve 80.

Furthermore, the present invention preferably includes means for measuring the moisture and flow rate of the coal transported to the gasifier 9, such as a moisture analyzer 42B and a coal mass flow meter 40B. This coal mass flow meter could consist of a gamma ray densitometer measuring the suspension density and an instrument measuring the average particle velocity by cross-correlating the signals of two capacitive density probes placed a certain distance apart in the coal feed line (see U.S. Pat. No. 3,635,082). The coal mass flow can then be calculated by using the following algorithm: Coal mass flow=the product of C×the particle velocity×the suspension density. 'C' is a constant based on the cross-sectional area of the density probe.

Signals are transmitted via lines 50D and 50C relative to the moisture and flow rate to the primary controller 45B. Additionally, a signal relative to the metal amount of moisture in the coal transported to the gasifier 9 is transmitted via line 59 coupled to a preliminary processor 64 for controlling the temperature of the gas injected into the pulverizer and preferably to controller 72 for adjusting the ratio of oxygen to coal.

In the case where moisture analyzer 42B is used, a direct measure is obtained of the moisture content of the coal to the reactor and the determination of the moisture in the raw coal (as measured by elements 12, 13 and 14) as well as the determination of the moisture content of the vent gas (as measured by elements 40A, 42A and 45A) is unnecessary. This mode of directly measuring the moisture in the coal transported to the gasifier operation is preferred over the mode previously described of indirectly measuring the moisture.

Although the system for controlling moisture in shown in FIG. 1 in its distributed form as discrete components, it would be readily understood by those skilled in the art that these components could be combined into a single unit or otherwise implemented as may be most convenient for the particular application at hand. Furthermore, although the preferred embodiment has been shown as using an electronic process control system for controlling the moisture content of coal transported to the gasifier, it is also understood by those skilled in the art that the present invention could be effected using manual or pneumatic controls.

The foregoing description of the invention is merely intended to be explanatory thereof, and various changes in the details of the described method and apparatus may be made within the scope of the appended claims without departing from the spirit of the invention.

What is claimed is:

1. A method of controlling moisture content of pulverized coal to a gasifier, said method comprising:

discharging coal from a first containing means to a weighing means;

weighing said coal;

determining a moisture content of said coal;

determining the total amount of moisture in said coal, said determining includes combining the weight of said coal with the determined moisture content of said coal;

transporting said coal to a means for pulverizing said coal;

pulverizing said coal;

injecting a gas of a preselected temperature and rate into said means for pulverizing said coal to remove the moisture from said coal;

removing at least some moisture from said coal;

transporting the pulverized coal to a means for removing particulates from the gas;

venting gas from said means for removing particulates from the gas;

measuring a rate of the gas vented from said means for removing said particulates from the gas;

determining a moisture content in the vented gas;

determining a total amount of moisture removed from said means for removing particulates from the gas, said determining includes combining the measured rate of gas vented and the determined moisture content in the vented gas;

conveying said coal to said gasifier;

determining a total amount of moisture in said coal convexed to said gasifier, said determining includes combining the determined total amount of moisture in said coal discharged from said first containing means with the total amount of moisture removed from said means for removing particulates from the gas;

obtaining a signal relative to the total amount of moisture in said coal conveyed to said gasifier;

transmitting said signal relative to the total amount of moisture in the coal conveyed to said gasifier to a means for controlling temperature of said means for pulverizing said coal;

adjusting the rate of injecting the gas into said means for pulverizing said coal;

adjusting the temperature of the gas injected into said means for pulverizing said coal;

transmitting said signal relative to the total amount of moisture in the coal conveyed to said gasifier to a means for controlling oxygen injected into said gasifier; and adjusting a ratio of oxygen to coal injected into said gasifier, said adjusting the ratio includes adjusting a rate of the oxygen injected into said gasifier.

2. A method for controlling moisture content of pulverized coal to a gasifier, said method comprising:

removing at least some moisture from said coal;
conveying said coal to said gasifier;
providing moisture measuring means located in proximity of said coal conveyed to said gasifier;
determining the total amount of moisture in said coal conveyed to said gasifier;
obtaining a signal relative to the total amount of moisture in said coal conveyed to said gasifier;
transmitting said signal relative to the total amount of moisture in said coal conveyed to said gasifier to a means for controlling temperature of a means for removing at least some moisture from said coal;
adjusting a temperature of said means for removing at least some moisture from said coal;
transmitting said signal relative to the total amount of moisture in said coal conveyed to said gasifier to a means for controlling oxygen injected into said gasifier; and
adjusting a ratio of said oxygen to said coal injected into said gasifier, said adjusting includes adjusting a rate of oxygen injected into said gasifier.

3. A method of controlling moisture content of pulverized solids to a reactor, the method comprising:

discharging solids from a first containing means to a weighing means;
weighing said solids;
determining a moisture content of said solids;
determining the total amount of moisture in said solids, said determining includes combining the weight of said solids and the determined moisture content of said solids;
transporting the solids to a means for drying said solids;
injecting a gas of a preselected temperature and rate into said means for drying said solids to remove at least some of the moisture from said solids;
removing at least some moisture from said solids;
transporting said solids to a second containing means;
venting gas from said second containing means;
measuring a rate of the gas vented from said second containing means;
determining a moisture content in the vented gas;
determining a total amount of moisture removed from said second containing means, said determining includes combining the measured rate of gas vented and the determined moisture content in the vented gas;
conveying said solids from said second containing means to said reactor;
determining a total amount of moisture in said solids conveyed to said reactor, said determining includes combining the determined total amount of moisture in said solids discharged from said first containing means with the total amount of moisture removed from said second containing means;

obtaining a signal relative to the total amount of moisture in said solids conveyed to said reactor;
transmitting said signal relative to the total amount of moisture in the solids conveyed to said reactor to a means for controlling temperature of said means for drying said solids;
adjusting the rate of injecting the gas into said means for drying said solids;
adjusting the temperature of the gas injected into said means for drying said solids;
transmitting said signal relative to the total amount of moisture in the solids conveyed to said reactor to a means for controlling oxygen injected into said reactor; and
adjusting a ratio of oxygen to solids injected into said reactor, said adjusting the ratio includes adjusting a rate of oxygen injected into said reactor.

4. A method of controlling moisture content of pulverized solids to a reactor, said method comprising:

removing at least some moisture from said solids;
conveying said solids to said reactor;
providing a moisture measuring means located in proximity of said solids conveyed to said reactor;
determining the total amount of moisture in said solids conveyed to said reactor;
obtaining a signal relative to the total amount of moisture in said solids conveyed to said reactor;
transmitting said signal relative to the total amount of moisture in said solids conveyed to said reactor to a means for controlling temperature of a means for removing at least some moisture from said solids;
adjusting a temperature of said means for removing at least some moisture from said solids;
transmitting said signal relative to the total amount of moisture in said solids conveyed to said reactor to a means for controlling oxygen injected into said reactor; and
adjusting a ratio of said oxygen to said solids injected into said reactor, said adjusting the ratio includes adjusting the rate of oxygen injected into said reactor.

5. An apparatus for controlling moisture content of pulverized coal to a gasifier, said apparatus comprising:

means for discharging coal from a first containing means to a weighing means for weighing said coal;
means for determining a moisture content of said coal;
means for determining the total amount of moisture in said coal, said means for determining includes means for combining the weight of said coal with the determined moisture content of said coal;
means for transporting said coal to a means for pulverizing said coal;
means for injecting a gas at a preselected temperature and rate into said means for pulverizing said coal to remove at least some of the moisture from said coal;
means for transporting the pulverized coal to a means for removing particulates from the gas;
means for venting gas from said means for removing particulates from the gas;
means for measuring a rate of the gas vented from said means for removing particulates from the gas;
means for determining a moisture content in the vented gas;
means for determining a total amount of moisture removed from said means for removing particulates from the gas, said means for determining includes means for combining the measured rate of gas vented and the determined amount of moisture in the vented gas;

means for conveying said coal to said gasifier;

means for determining a total amount of moisture in said coal conveyed to said gasifier, said means for determining includes means for combining the determined total amount of moisture in said coal discharged from said first containing means with the total amount of moisture removed from said means for removing particulates from the gas;

means for obtaining a signal relative to the total amount of moisture in said coal conveyed to said gasifier;

means for transmitting the signal relative to the total amount of moisture in the coal conveyed to said gasifier to a means for controlling temperature of said means for pulverizing said coal;

means for adjusting the rate of injecting said gas into said means for pulverizing said coal;

means for adjusting the temperature of said gas injected into said means for pulverizing said coal; and means for transmitting said signal relative to the total amount of moisture in the coal conveyed to said gasifier to a means for controlling a ratio of oxygen to coal injected into said gasifier, said means for controlling the ratio includes means for adjusting a rate of oxygen injected into said gasifier.

6. An apparatus for controlling moisture content of pulverized coal to a gasifier, said apparatus comprising:

means for removing at least some moisture from said coal;

means for conveying said coal to said gasifier;

moisture measuring means located in proximity of said coal conveyed to said gasifier;

means for determining the total amount of moisture in said coal conveyed to said gasifier;

means for obtaining a signal relative to the total amount of moisture in said coal conveyed to said gasifier;

means for transmitting said signal relative to the total amount of moisture in said coal conveyed to said gasifier to a means for controlling temperature of a means for removing at least some moisture of said coal;

means for adjusting a temperature of said means for removing at least some moisture from said coal; and means for transmitting said signal relative to the total amount of moisture in said coal conveyed to said gasifier to a means for controlling a ratio of oxygen to said coal injected into said gasifier, said means for controlling the ratio includes means for adjusting rate of oxygen injected into said gasifier.

7. An apparatus for controlling moisture content of solids to a reactor, said apparatus comprising:

means for discharging said solids from a first containing means to a weighing means for weighing said solids;

means for determining a moisture content of said solids;

means for determining the total amount of moisture in said solids, said means for determining includes means for combining the weight of said solids with the determined moisture content of said solids;

means for transporting the solids to a means for removing at least some moisture from the solids;

means for injecting a gas of a preselected temperature and rate into said means for removing at least some moisture from said solids;

means for transporting said solids to a second containing means;

means for venting gas from said second containing means;

means for measuring a rate of the gas vented from said second containing means;

means for determining a moisture content in the vented gas;

means for determining the total amount of moisture removed from said second containing means, said means for determining includes means for combining the measured rate of gas vented and the determined moisture content and the vented gas;

means for conveying said solids from said second containing means to said reactor;

means for determining a total amount of moisture in said solids conveyed to said reactor, said means for determining include means for combining the determined total amount of moisture in said solids discharged from said first containing means with the total amount of moisture removed from said second containing means;

means for obtaining a signal relative to the total amount of moisture in said solids conveyed to said reactor;

means for transmitting said signal relative to the total amount of moisture in the solids conveyed to said reactor to a means for controlling temperature of said means for removing at least some moisture from said solids;

means for adjusting the rate of injecting the gas into said means for removing at least some moisture from said solids;

means for adjusting the temperature of the gas injected into said means for removing at least some moisture from said solids;

means for transmitting said signal relative to the total amount of moisture in the solids conveyed to said reactor to a means for controlling a ratio of oxygen to solids injected into said reactor, said means for controlling the ratio includes means for adjusting a rate of oxygen injected into said reactor.

8. An apparatus for controlling moisture content of solids to a reactor, said apparatus comprising:

means for removing at least some moisture from said solids;

means for conveying said solids to said reactor;

moisture measuring time located in proximity of said solids conveyed to said reactor;

means for determining the total amount of moisture in said solids conveyed to said reactor;

means for obtaining a signal relative to the total amount of moisture in said solids conveyed to said reactor;

means for transmitting said signal relative to the total amount of moisture in said solids conveyed to said reactor to a means for controlling temperature of a means for removing at least some moisture from said solids;

means for adjusting a temperature of said solids for removing at least some moisture from said solids;

means for transmitting said signal relative to the total amount of moisture in said solids conveyed to said reactor to a means for controlling a ratio of said oxygen to said solids injected into said reactor, said means for controlling the ratio includes means for adjusting a rate of oxygen injected into said reactor.

9. A method of controlling moisture content of coal to a gasifier, said method comprising:
discharging coal from a first containing means to a weighing means;
weighing said coal;
determining the moisture content of said coal;
determining the total amount of moisture in said coal, said determining includes combining the weight of said coal with the determined moisture content of said coal;
transporting said coal to a means for removing at least some moisture from said coal;
removing at least some moisture from said coal;
transporting the coal to a second containing means;
venting gas from said second containing means;
measuring a rate of the gas vented from said second containing means;
determining a moisture content in the vented gas;
determining a total amount of moisture removed from said second containing means, said determining includes combining the measured rate of gas vented and the determined moisture content in the vented gas;
conveying said coal to said gasifier;
determining a total amount of moisture in said coal conveyed to said gasifier, said determining includes combining the determined total amount of moisture in said coal discharged from said first containing means with the total amount of moisture removed from said second containing means for removing particulates from the gas;
obtaining a signal relative to the total amount of moisture in said coal conveyed to said gasifier;
transmitting said signal relative to the total amount of moisture in the coal conveyed to said gasifier to a means for controlling the temperature of said means for removing at least some moisture from the coal; and
adjusting the temperature of said means for removing at least some moisture from said coal.

10. The method of claim 9 including transmitting said signal relative to the total amount of moisture in coal conveyed to said gasifier to a means for controlling a ratio of oxygen to coal injected into said gasifier.

11. The method of claim 10 wherein controlling the ratio includes adjusting a rate of the oxygen injected into said gasifier.

12. A method for controlling moisture content of solids to a reactor, said method comprising:
conveying said solids from a first containing means to said reactor;
providing moisture measuring means located in proximity of said solids conveyed to said reactor;
determining the total amount of moisture in said solids conveyed to said reactor;
obtaining a signal relative to the total amount of moisture in said solids conveyed to said reactor;
transmitting said signal relative to the total amount of moisture in said solids conveyed to said reactor to a means for controlling temperature of a means for removing at least some moisture from said solids; and
adjusting a temperature of said means for removing at least some moisture from said solids.

13. The method of claim 12 including transmitting said signal relative to the total amount of moisture in said solids conveyed to said reactor to a means for controlling a ratio of said oxygen to said solids injected into said reactor.

14. The method of claim 13 wherein said controlling the ratio includes adjusting a rate of oxygen injected into said reactor.

15. A method of controlling moisture content of solids to a reactor, the method comprising:
discharging solids from a first containing means to a weighing means;
weighing said solids;
determining a moisture content of said solids;
determining the total amount of moisture in said solids, said determining includes combining the weight of said solids and the determined moisture content of said solids;
transporting the solids to a means for drying said solids;
removing at least some moisture from said solids;
transporting said solids to a second containing means;
venting gas from said second containing means;
measuring a rate of the gas vented from said second containing means;
determining a moisture content in the vented gas;
determining a total amount of moisture removed from said second containing means, said determining includes combining the measured rate of gas vented and the determined moisture content in the vented gas;
conveying said solids from said second containing means to said reactor;
determining a total amount of moisture in said solids conveyed to said reactor, said determining includes combining the determined total amount of moisture in said solids discharged from said first containing means with the total amount of moisture removed from said second containing means;
obtaining a signal relative to the total amount of moisture in said solids conveyed to said reactor;
transmitting said signal relative to the total amount of moisture in the solids conveyed to said reactor to a means for controlling temperature of said means for drying said solids; and
adjusting the temperature of said means for drying said solids.

16. The method of claim 15 including transmitting said signal relative to the total amount of moisture in the solids conveyed to said reactor a means for controlling a ratio of oxygen to solids injected into said reactor.

17. The method of claim 16 wherein controlling the ratio includes adjusting a rate of oxygen injected into said reactor.

18. An apparatus for controlling moisture content of coal to a gasifier, said apparatus comprising:
means for discharging coal from a first containing means to a weighing means for weighing said coal;
means for determining a moisture content of said coal;
means for determining the total amount of moisture in said coal, said means for determining includes means for combining the weight of said coal with the determined moisture content of said coal;
means for transporting said coal to a means for removing at least some moisture from said coal;
means for transporting the coal to a second containing means;

means for venting gas from said second containing means;

means for measuring a rate of the gas vented from said second containing means;

means for determining a moisture content in the vented gas;

means for determining a total amount of moisture removed from second containing means, said means for determining includes means for combining the measured rate of gas vented and the determined amount of moisture in the vented gas;

means for conveying said coal to said gasifier;

means for determining a total amount of moisture in said coal conveyed to said gasifier, said means for determining includes means for combining the determined total amount of moisture in said coal discharged from said first containing means with the total amount of moisture removed from said second containing means;

means for obtaining a signal relative to the total amount of moisture in said coal conveyed to said gasifier;

means for transmitting the signal relative to the total amount of moisture in the coal conveyed to said gasifier to a means for controlling temperature of said means for removing at least some moisture from said coal; and means for adjusting the temperature of said means for removing at least some moisture from said coal.

19. The apparatus of claim 18 including means for transmitting said signal relative to the total amount of moisture in the coal conveyed to said gasifier to a means for controlling a ratio of oxygen to coal injected into said gasifier.

20. The apparatus of claim 19 wherein controlling the ratio includes means for adjusting a rate of oxygen injected into said gasifier.

21. An apparatus for controlling moisture content of solids to a reactor, said apparatus comprising:

means for discharging said solids from a first containing means to a weighing means for weighing said coal;

means for determining a moisture content of said solids;

means for determining the total amount of moisture in said solids, said means for determining includes means for combining the weight of said solids with the determined moisture content of said solids;

means for transporting the solids to a means for removing at least some moisture from the solids;

means for transporting said solids to a second containing means;

means for venting gas from said second containing means;

means for measuring a rate of the gas vented from said second containing means;

means for determining a moisture content in the vented gas;

means for determining the total amount of moisture removed from said second containing means, said means for determining includes means for combining the measured rate of gas vented and the determined moisture content of the vented gas;

means for conveying said solids from said second containing means to said reactor;

means for determining a total amount of moisture in said solids conveyed to said reactor, said means for determining includes means for combining the determined total amount of moisture in said solids discharged from said first containing means with the total amount of moisture removed from said second containing means;

means for obtaining a signal relative to the total amount of moisture in said solids conveyed to said reactor;

means for transmitting said signal relative to the total amount of moisture in the solids conveyed to said reactor to a means for controlling temperature of said means for removing at least some moisture from said solids; and means for adjusting the temperature of said means for removing at least some moisture from said solids.

22. The apparatus of claim 21 including means for transmitting said signal relative to the total amount of moisture in the solids conveyed to said reactor to a means for controlling a ratio of oxygen to solids injected into said reactor.

23. The apparatus of claim 22 wherein said means for controlling the ratio includes means for adjusting a rate of oxygen injected into said reactor.

24. An apparatus for controlling moisture content of solids to a reactor, said apparatus comprising:

means for conveying said solids from a first containing means to said reactor;

moisture measuring means located in proximity of said solids conveyed to said reactor;

means for determining the total amount of moisture in said solids conveyed to said reactor;

means for obtaining a signal relative to the total amount of moisture in said solids conveyed to said reactor;

means for transmitting said signal relative to the total amount of moisture in said solids conveyed to said reactor to a means for controlling temperature of said means for removing at least some moisture from said solids; and means for adjusting a temperature of said means for removing at least some moisture from said solids.

25. The apparatus of claim 24 including means for transmitting said signal relative to the total amount of moisture in said solids conveyed to said reactor to a means for controlling a ratio of said oxygen to said solids injected into said reactor.

26. The apparatus of claim 25 wherein said means for controlling the ratio includes means for adjusting a rate of oxygen injected into said reactor.

27. An apparatus for controlling moisture content of solids to a reactor, said apparatus comprising:

means for conveying said solids from a first containing means to said reactor;

moisture measuring means located in proximity of said solids conveyed to said reactor;

means for determining the total amount of moisture in said solids conveyed to said reactor;

means for removing at least some moisture from said solids; and means for adjusting a temperature of said means for removing at least some moisture from said solids.

28. An apparatus for controlling moisture content of coal to a gasifier, said apparatus comprising:

means for conveying said coal from a first containing means to said gasifier;

moisture measuring means located in proximity of said coal conveyed to said gasifier;

means for determining the total amount of moisture in said coal conveyed to said gasifier; and means for removing at least some moisture from said coal.

29. The apparatus of claim 28 including means for adjusting a temperature of said means for removing at least some moisture from said coal.

30. A method for controlling moisture content of solids to a reactor, said method comprising:

conveying said solids to said reactor;

measuring moisture of said solids conveyed to said reactor;

determining the total amount of moisture in said solids conveyed to said reactor;

removing at least some moisture from said solids; and adjusting a temperature of said means for removing at least some moisture from said solids.

* * * * *